S. S. FURRER.
BEET PLOW.
APPLICATION FILED JULY 1, 1920.

1,413,019.

Patented Apr. 18, 1922.
2 SHEETS—SHEET 1.

Inventor
Samuel S. Furrer
by Westall and Wallace
his Attorneys

S. S. FURRER.
BEET PLOW.
APPLICATION FILED JULY 1, 1920.

1,413,019.

Patented Apr. 18, 1922.
2 SHEETS—SHEET 2.

Inventor
Samuel S. Furrer
by Nestall and Wallace
his Attorneys

UNITED STATES PATENT OFFICE.

SAMUEL S. FURRER, OF OXNARD, CALIFORNIA.

BEET PLOW.

1,413,019.  Specification of Letters Patent.  Patented Apr. 18, 1922.

Application filed July 1, 1920. Serial No. 393,254.

*To all whom it may concern:*

Be it known that I, SAMUEL S. FURRER, a citizen of the United States, residing at Oxnard, county of Ventura, State of California, have invented new and useful Improvements in a Beet Plow, of which the following is a specification.

This invention relates to a beet plow or lifter, which is adapted to loosen the soil about the beets and deep growing roots without throwing them to the surface, so that they may be pulled from the ground with ease.

An object of this invention is to provide a plow of the character described, which will loosen beets in extremely hard ground, and which is so constructed that the plow may be put into the ground and held therein against jumping out at hard spots, and easily withdrawn from the ground to inoperative position. It is another object of this invention to provide a strong, durable plow, simple in structure, easily manipulated and requiring substantially no attention while plowing.

Figure 1:
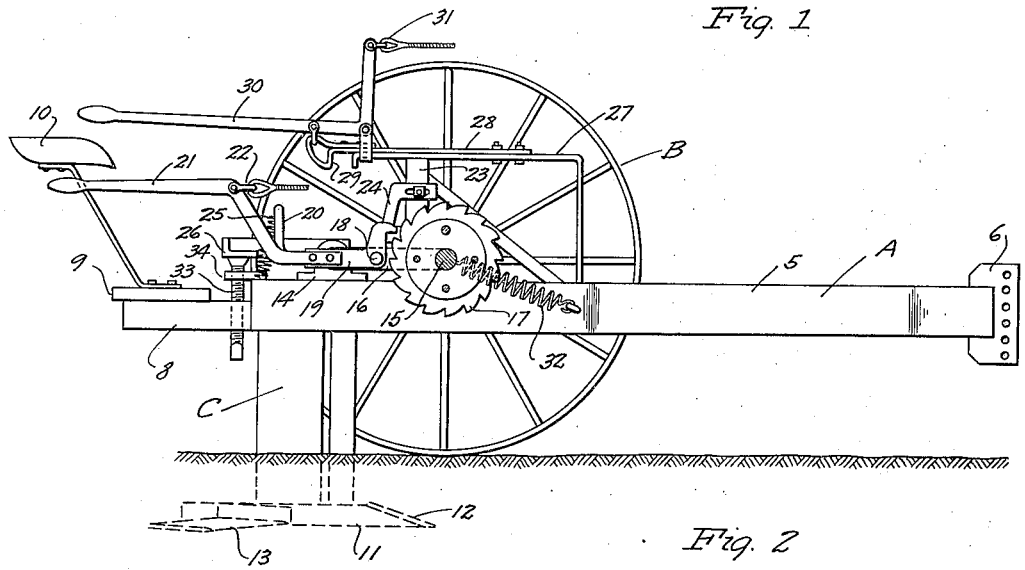
Figure 2:
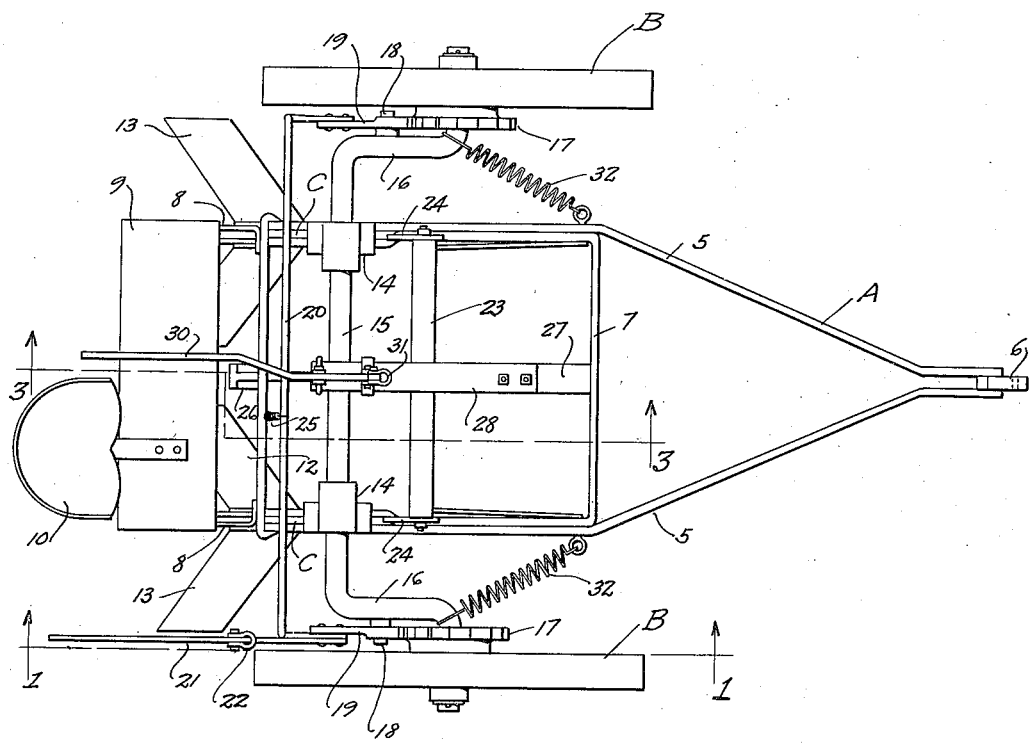
Figure 3:
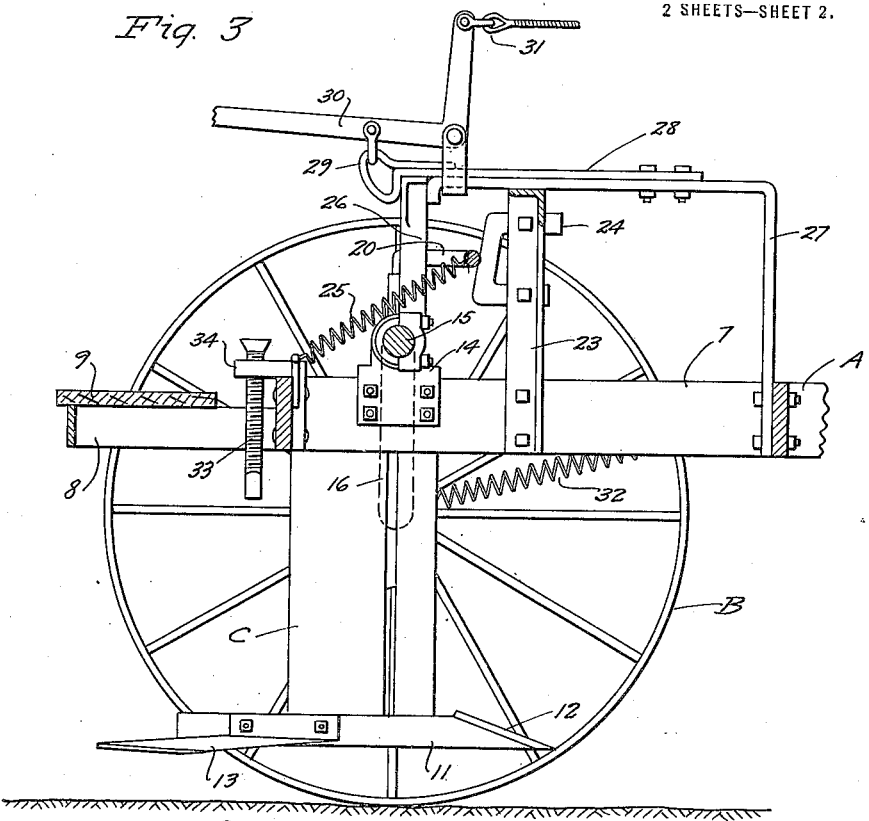
Figure 4:
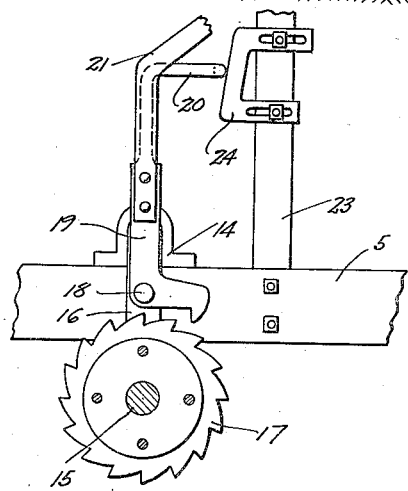

These objects will be more fully understood, as will also other objects and corresponding accomplishments of my invention from the following detailed description of a preferred embodiment thereof. For the purpose of this description, reference is had to the accompanying drawings, in which:

Fig. 1 is a side elevation of a complete plow with the knives in the ground, a section on the line 1—1 of Fig. 2 having been taken; Fig. 2 is a plan view of the plow; Fig. 3 is an enlarged central vertical section of a fragment of the plow taken on the line 3—3 of Fig. 2, showing the knives raised; and Fig. 4 is a side elevation of a portion of the lifting mechanism on an enlarged scale.

Referring more particularly to the drawing, a frame is indicated by A. The frame is supported upon ground wheels B by means of an axle mounted on the frame. Secured to and depending from the frame are standards C which carry the chisels and shears. There are two standards in the embodiment of the invention shown making a four row plow.

The frame A, as shown, consists of corresponding side bars 5 bent toward each other and secured at the front end to a draft connection 6. The bars 5 are secured to parallel side members of a rectangularly bent bar 7. The side arms of bar 7 are offset inwardly to provide a space between side bars 5 and the bar 7 for the standards C. Bars 8 are extended beyond the rear end of bars 5 to provide a support for a platform 9 for an operator, if thought advisable to use one. Secured to the platform is a seat 10. Clamped between each side bar 5 and the adjacent side arm of bar 7 is a standard C. Secured to the bottom of a standard C is a landside 11 having a chisel blade 12 at the point, and laterally extending shears 13.

Mounted upon the frame at the sides are bearing blocks 14, in which is mounted an axle 15. The ends of the axle are offset as indicated by 16, and journalled thereon are the ground wheels. Each of the ground wheels has secured thereto a ratchet wheel 17. It is obvious that the ground wheels are mounted upon an axle in the nature of a crank shaft with the offsets forming the crank arms. When the crank arms are horizontal, the standards are in their lower position as shown in Figs. 1 and 2. When the crank arms are swung downwardly into a vertical position, the standards will be raised as shown in Fig. 3. Means must be provided to lock the axle in either of the positions before described.

Formed on the crank arms 16 are pivot pins 18, and mounted thereon are pawls 19 for engagement with the teeth of the ratchet wheel 17. A bar 20 ties the pawls together, so that they may be moved in unison. A lever 21 is secured to one of the pawls and extends backwardly so that it is disposed conveniently for operation by one occupying the seat 10. There is an offset in the lever 21, and clevis 22 is attached thereto for fastening a rope which may extend forward to the operator of a tractor which draws the plow. A bar 23 with the ends parallel is secured to the sides of the frame forming standards and a cross member. Secured to the standards are buffer or disengaging members 24. The buffers are so disposed that when the tie member 20 is swung upwardly it will engage them. Tending to hold the tie member in its lower position is a spring 25 secured to the frame. Secured to the shaft 15 is a latch bar 26, which will swing upwardly as the crank arms 16 of the axle swing downwardly. When the plows are in the ground, the latch bar is in horizontal position as shown in Figs. 1 and 2. When the plows are raised, the latch bar is in vertical position. Secured to the frame is a supporting bar 27, and mounted thereon is a leaf spring 28. The free end of the leaf spring is provided with a catch 29 disposed to hook over the latch bar, when the latter is in vertical position, as shown in Fig. 3. Thus, when the plows are raised, the axle is held in its raised position. A release lever 30 is pivotally mounted upon the supporting bar 27. This lever is of angle form and has a clevis 31 to which a rope may be attached leading to the tractor, whereby the release lever may be operated from the tractor. The handle extends to a point adjacent the operator's seat 10. Adjacent the pivotal point, the handle is connected by a clevis to the catch. By tilting the handle upwardly, or pulling forwardly upon a clevis 31, the catch is raised releasing the latch bar. Secured to the axle and to the frame are tension springs 32, which tend to hold the axle with the crank arms horizontal. The latch bar 26 is held in horizontal position by resting upon the head of an adjustable support 33 consisting of a threaded rod passing through a bracket 34 secured to the frame.

Assume that the plow is in the position shown in Fig. 3, that is, with the knives raised. It is desired to place the knives in the ground. Lever 30 is rocked by pulling upon the rope leading to it from the tractor or, if an operator upon the plow be used, by lifting the handle of the lever. The weight of the frame which is carried upon axle 15 will cause the latter to turn in the frame toward the horizontal position shown in Figs. 1 and 2. This swinging movement being at an angle between the vertical and horizontal, the point of the chisels will be disposed at an inclination to the ground. Upon pulling the plow forward, the chisels enter the ground, and start downwardly, the axle continuing its movement until in the lowest position with the latch bar 26 engaged with the head of the supporting member 33. The entire weight of the frame and its associated parts is pressing downwardly upon the plow, tending to hold it in the ground. If it be desired to raise the plow from the ground, lever 21 is swung by lifting the handle or pulling forwardly upon the rope attached thereto. This causes the pawls 19 to engage with the teeth of the ratchet wheels 17, and the axle 15 is compelled to turn in the bearing 14 with the wheel. The axle would continue to turn in the bearing 14 unless the pawls 19 were disengaged. When the crank arm of the axle reaches vertical position, the tie bar 20 will engage the buffers 24. Further movement of the axle will cause the pawls 19 to disengage from the ratchet wheel. However, latch bar 26 has been caught and held in its upper position by the catch 29. The knives are now clear of the ground and will be held in this position until the catch 29 is disengaged. Immediately upon disengagement of the pawls from the ratchet wheels, spring 25 pulls the tie bar and its associated parts back into normal position as shown in Figs. 1 and 2.

It is obvious that no effort is required to force the knives into the ground. Upon release of the latch bar from the position shown in Fig. 3, the knives drop until the chisel points engage the ground. Forward movement of the plow causes the knives to dig into the ground until they have reached the position shown in Fig. 1. The whole weight of the frame and its associated parts holds the knives in the ground while plowing. Substantially no effort is required to raise the knives from the ground, a pull upon lever 21 sufficient to engage the pawls with the ratchet wheels is all the effort necessary. Thereafter, the pull upon the plow swings the axle into the position where the plows are out of the ground.

What I claim is:

In a plow, the combination of a frame having one or more plow knife structures secured thereto, a crank axle journalled on said frame between the crank arms thereof, ground wheels journaled at the ends of the crank arms, a ratchet wheel secured to a ground wheel, a pivoted pawl mounted on a crank arm of said axle for engagement with said ratchet wheel whereby to lock the latter against rotation on said axle, the pivotal axis of said pawl revolving with said crank arm, a release bar secured to said pawl so as to revolve therewith, a disengagement member mounted on said frame in the path of revolution of said pawl so as to be engaged by said release bar and thereby rock and disengage said pawl, a latch arm secured to said axle so as to revolve therewith, and a spring catch mounted on said frame and disposed to hook over said latch arm when the axle is in plow raised position.

In witness that I claim the foregoing I have hereunto subscribed my name this 21st day of June, 1920.

SAMUEL S. FURRER.